United States Patent
Miller et al.

(10) Patent No.: US 11,641,812 B1
(45) Date of Patent: May 9, 2023

(54) APPARATUS AND SYSTEM FOR IMPROVING CONSISTENT SPACING BETWEEN PLANT GROWING AREAS AND FOR MOVING SAME

(71) Applicant: Phat Panda LLC, Spokane, WA (US)

(72) Inventors: Tyler Miller, Chattaroy, WA (US); Mojave Morelli, Spokane, WA (US)

( * ) Notice: Subject to any disclaimer, the term of this patent is extended or adjusted under 35 U.S.C. 154(b) by 0 days.

(21) Appl. No.: 17/540,804

(22) Filed: Dec. 2, 2021

(51) Int. Cl.
*A01G 9/28* (2018.01)
*A01G 9/02* (2018.01)

(52) U.S. Cl.
CPC ............... *A01G 9/28* (2018.02); *A01G 9/027* (2013.01)

(58) Field of Classification Search
CPC .......... A01G 9/28; A01G 9/027; A01G 9/028; A01G 9/0295; A01G 9/0297
See application file for complete search history.

(56) References Cited

U.S. PATENT DOCUMENTS

| | | | | |
|---|---|---|---|---|
| 3,615,026 | A * | 10/1971 | Englert et al. | A01G 9/088 211/80 |
| 5,664,370 | A * | 9/1997 | Boudreau | A01G 9/027 47/87 |
| 7,490,435 | B2 | 2/2009 | Singer | |
| 7,845,114 | B2 * | 12/2010 | Kirtz | A01G 9/045 47/87 |
| 7,975,430 | B2 * | 7/2011 | Scott | A01G 31/06 211/80 |
| 10,076,086 | B2 * | 9/2018 | Daas | A01G 9/088 |
| 10,595,468 | B2 | 3/2020 | Anderson et al. | |
| 10,856,473 | B1 * | 12/2020 | Wagner | A01G 25/06 |

(Continued)

FOREIGN PATENT DOCUMENTS

| | | | | |
|---|---|---|---|---|
| CN | 101161052 A | * | 4/2008 | ............ A01G 9/025 |
| CN | 102976491 B | | 12/2013 | |

(Continued)

OTHER PUBLICATIONS

Getachew Amare, Hailay Gebremedhin, Effect of Plant Spacing on Yield and Yield Components of Tomato (*Solanum lycopersicum* L.) in Shewarobit, Central Ethiopia, Hindawi, Sep. 24, 2020, vol. 2020, ID. 8357237, United Kingdom, accessible at: https://www.hindawi.com/journals/scientifica/2020/8357237/.

(Continued)

*Primary Examiner* — Monica L Perry
*Assistant Examiner* — Aaron M Rodziwicz
(74) *Attorney, Agent, or Firm* — Derek Fahey, Esq.; The Plus IP Firm, PLLC

(57) ABSTRACT

A system for improving consistent spacing between plant growing areas and for moving plant growing area comprising a plurality of beds arranged next to each other. Each bed comprises a receiving area for receiving plants and a perimeter, at least one movable element proximate to a bottom side of each of the plurality of beds allowing each bed to move in a first direction and a second direction, and an opening proximate to the perimeter of each bed. Further included is a u-shaped spacer comprising a first leg, a second leg, and a cross-member. The first leg is removably received by the opening of a first bed of the plurality of beds, and the second leg of the u-shaped spacer is removably received by the opening of a second bed of the plurality of beds that is adjacent to the first bed.

17 Claims, 10 Drawing Sheets

(56) References Cited

U.S. PATENT DOCUMENTS

| | | | |
|---|---|---|---|
| 10,980,198 B2 | 4/2021 | Hessel et al. | |
| 11,116,147 B1* | 9/2021 | Chojnacki | A01G 9/0297 |
| 2006/0150508 A1* | 7/2006 | Whitcomb | A01G 9/02 |
| | | | 47/86 |
| 2006/0218862 A1* | 10/2006 | Dyas | A01G 9/0295 |
| | | | 47/1.01 P |
| 2008/0086944 A1* | 4/2008 | Ribeiro De Matos | A01G 9/088 |
| | | | 47/82 |
| 2008/0302008 A1* | 12/2008 | Jung | A01G 9/027 |
| | | | 47/79 |
| 2009/0277088 A1* | 11/2009 | Scott | A01G 31/06 |
| | | | 47/62 R |
| 2010/0242360 A1* | 9/2010 | Dyas | A01G 9/143 |
| | | | 47/66.5 |
| 2012/0227322 A1 | 9/2012 | Belmonte | |
| 2019/0282003 A1* | 9/2019 | Otchere | A01G 9/02 |
| 2020/0154658 A1 | 5/2020 | Narayanaswamy | |
| 2022/0030779 A1* | 2/2022 | Chojnacki | A01G 9/027 |
| 2022/0071103 A1* | 3/2022 | Venderbosch | A01G 7/02 |

FOREIGN PATENT DOCUMENTS

| | | | | |
|---|---|---|---|---|
| FR | 2701351 A1 * | 8/1994 | | A47G 7/025 |
| KR | 101766364 B2 | 8/2017 | | |
| WO | 2018068335 A1 | 4/2018 | | |

OTHER PUBLICATIONS

The Educators LTD, Media Bed Teqnique, Publication Date believed to be Aug. 1, 2020 as indicated by the URL, Date First Accessed: Oct. 11, 2021, accessible at: http://www.theeducators.co/2020/08/01/media-bed/.

* cited by examiner

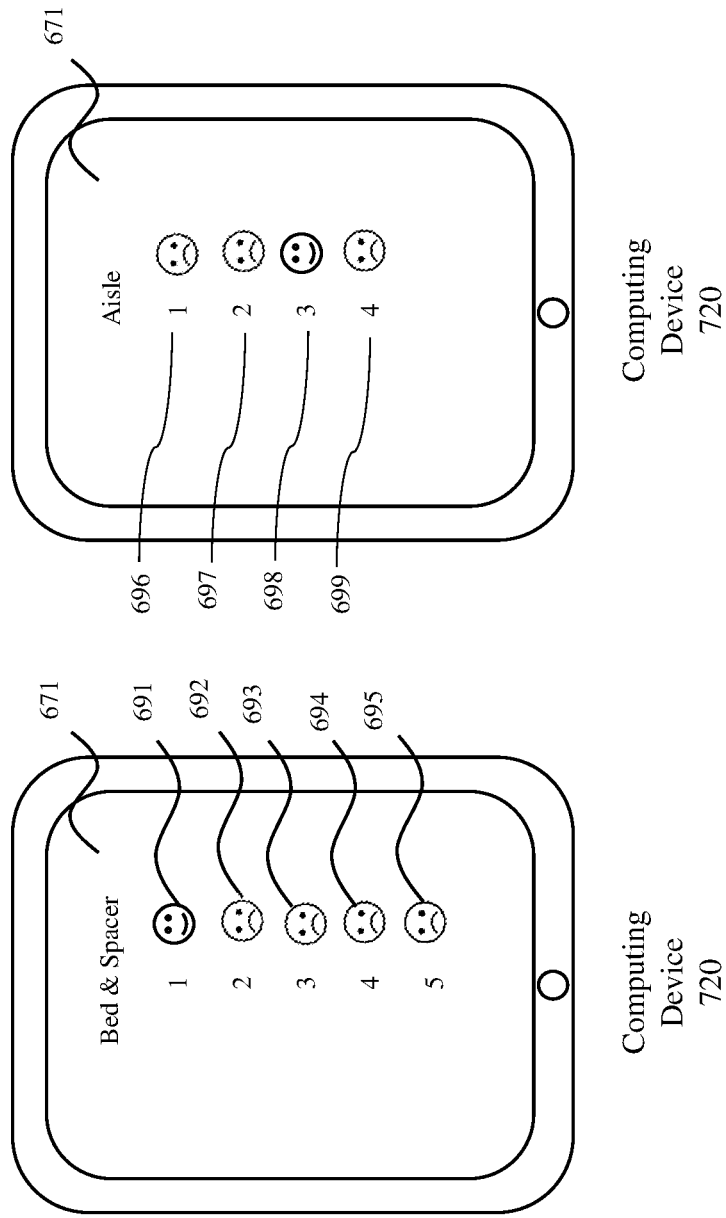

APPARATUS AND SYSTEM FOR IMPROVING CONSISTENT SPACING BETWEEN PLANT GROWING AREAS AND FOR MOVING SAME

CROSS-REFERENCE TO RELATED APPLICATIONS

Not applicable

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The present method and system relates to field plant growing material, and more specifically to the field of systems for growing plants on plant beds.

BACKGROUND

Each year more farmers are making the switch from outdoor to indoor cultivation. One of the many benefits to indoor cultivation is the ability to control the environment and weather conditions in which the plants are grown in. No longer do farmers need to rely on mother nature to determine what they can and cannot grow. Farmers can now grow a variety of highly coveted, commercial plants of equal or better quality and consistency year round. The ever growing list of commercial plants that are being grown indoors comprises a variety of herbs, fruits, or vegetables such as mint, sage, raw cocoa, flax seed, hibiscus, tomatoes, hemp, hops, and *cannabis*. The listed plants all share a common feature in that they grow under similar environmental conditions that can be duplicated artificially, which makes them a popular choice for indoor cultivation. The evolution of technology has made this transition possible.

There is widespread popularity in the family of plants known as cannabaceae. due to their rising commercial value as well as the wide array of uses stemming from the products extracted from their flowers. Hemp, for example, has become a wildly popular product ever since its federal legalization in 2018. In just a few short years the United States has become the world's third largest producer of hemp, and for good reasons. Hemp is an extraordinarily versatile plant. It can be used to make food, clothing, paper products, construction material, plastic, fuel, soaps, CBD oils, and much more. *Humulus lupulus*, better known as hops, is another widely popular product stemming from the cannabaceae family. Hop flowers are harvested and used for various purposes but is primarily used as a bittering, flavoring, and stability agent in beer. *Cannabis* products are also believed to have medicinal uses and because of this, many states allow them to be prescribed by physicians to patients with medical conditions. It is ideal for those who grow such plants to be able to replicate the quality of their previous harvests in taste, smell, yield, etc.

A longstanding issue which has plagued the growing industry for years now is the inconsistency in plant growth. The quality of a plant can vary between different harvests and between individual plants within the same harvest as well. These inconsistencies may include the size of the fully grown plant, the number of buds or flowers that the plant produces, the quality of these buds or flowers such as their taste or smell, the overall lifespan of the plant, etc. One of the contributors to these inconsistencies is the cultivator's inability to access and examine plants during the growing process.

The plants in an indoor growing room are typically spaced close together to maximize the number of plants that can be grown in the room. However, the drawback to this method is that there is very little or no room at all for the cultivator to access the plants that are towards the middle of the growing area, away from the edges. If the cultivator cannot access his plants, he will not be able to examine them during the growth stage and check on the health of his plants. This could lead to poor plant development, inconsistent growth, or plants going unchecked for too long and dying.

The only current solutions to this problem are for the cultivator to either attempt to navigate between the plants or rearrange. The first solution is not ideal because the cultivator may damage the plants while trying to maneuver across the growing area. The second solution is not ideal as well because constantly rearranging the plants may harm their growth and is also time consuming.

As a result, there exists a need for improvements over the prior art and more particularly for a more efficient way of spacing plants in a growing room to optimize plant production, enable the cultivator to properly examine plants in a growing room in an effective and time-saving way, and promote consistent quality and growth among plants.

SUMMARY

An apparatus and system for improving consistent spacing between plant growing areas and for moving same is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment an apparatus and system for improving consistent spacing between plant growing areas and for moving plant growing area is disclosed. The system includes a plurality of beds arranged next to each other. Each bed of the plurality of beds comprises a receiving area for receiving plants and a perimeter, at least one movable element proximate to a bottom side of each of the plurality of beds allowing each bed to move in a first direction and a second direction, and an opening proximate to the corner of each of the plurality of beds. The system further includes a u-shaped spacer, wherein the u-shaped spacer comprises a first leg, a second leg, and a cross-member attaching the first leg to the second leg. The first leg is removably received by the opening of a first bed of the plurality of beds, and the second leg of the u-shaped spacer is removably received by the opening of a second bed of the plurality of beds that is adjacent to the first bed.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein:

FIG. 7B is a diagram of a graphical display interface showing graphical indicators relating to the configuration of the bed and u-shaped spacers of the spacing system to promote plant growth, according to an example embodiment.

FIG. 7C is a diagram of a graphical display interface showing which aisles are accessible to a user of the spacing system to promote plant growth, according to an example embodiment.

DETAILED DESCRIPTION

Figure 1:
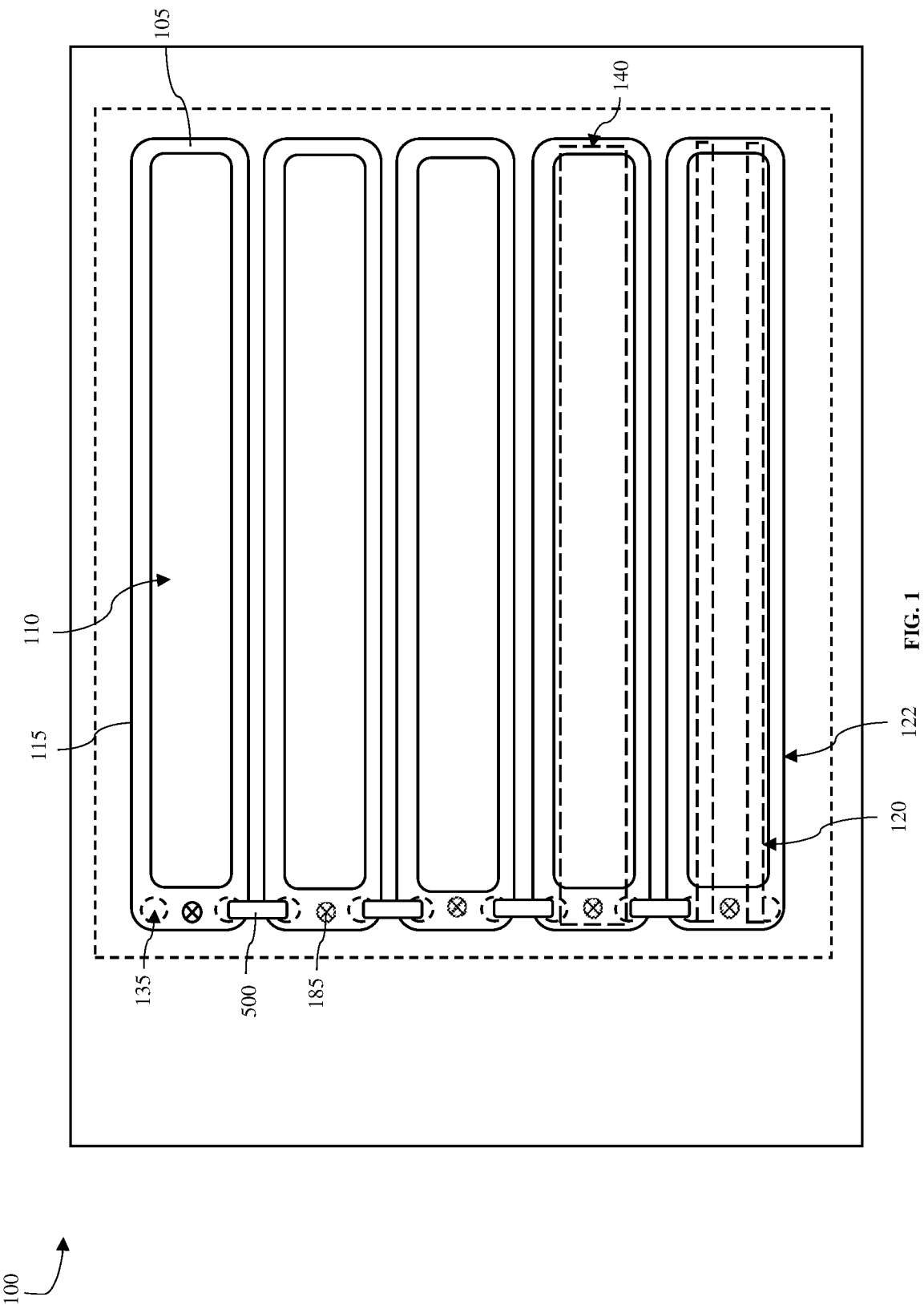
FIG. 1 is a top view of a system for improving the consistent spacing and moving of plant growing areas, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting, reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a system and method for efficiently spacing and moving plant growing areas. The system allows for organized spacing and safe accessibility of plant growing areas by configuring a plurality of beds, a u-shaped spacer, a movable element, and a securing element. Each grow area is organized by a plurality of beds configured to hold plants in a receiving area surrounded by a perimeter. An opening proximate to the perimeter of each bed receives a leg from a u-shaped spacer, which comprises two legs, such that adjacent beds are in attachment with each leg of a u-shaped spacer to achieve ideal spacing. For mobility of the beds, at least one movable element proximate to the bottom side of each bed such that the beds may move in two opposite directions. To efficiently move beds for access of an aisle between two beds, the u-shaped spacer connecting said beds and the two adjacent u-shaped spacers must be removed. The two beds can now move in a second direction away from the aisle to allow passage. Once the beds are moved, a securing element keeps the beds from moving in a first direction towards the aisle while unattached from a u-shaped spacer. This system of moving plant growing areas allows for organized accessibility of plants to avoid harming the plants while moving the grow areas.

Figure 2:
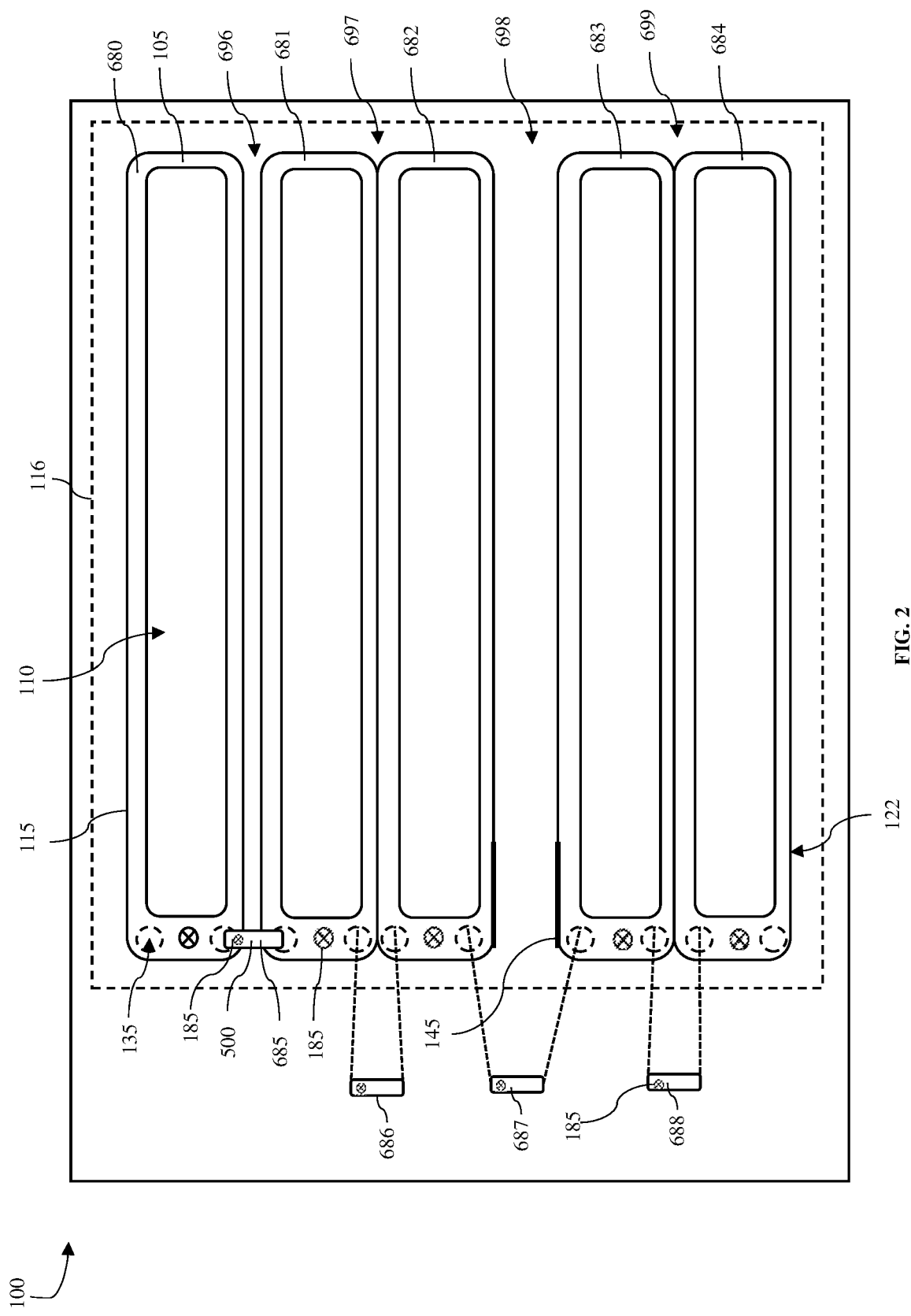
FIG. 2 is a top view of the system for improving the consistent spacing and moving of plant growing areas, according to an example embodiment.

Referring now to the figures, FIG. 1 and FIG. 2 are top views of a system 100 for improving the consistent spacing and moving of plant growing areas, according to an example embodiment. A plurality of beds 105 is arranged next to each other such that the long sides of a bed are parallel to the long sides of an adjacent bed. Adjacent beds are those that are in close proximity to each other. The beds may be positioned within an area 116 that has optimal growing conditions. The spacing of these keeps is important such the maximum amount of beds are located within the area 116. One of the biggest challenges is that operators will move beds to maneuver within the area 116 but will then forget to reposition the beds properly so that the beds properly spaced so that the maximum amount of beds 105 and positioned within in the area. The current system solves this problem.

Each bed of the plurality of beds comprises a receiving area 110 for receiving plants and a perimeter 115 defined by the edges of the bed. Each bed defines a grow area within the system. For mobility, the beds also include at least one movable element 120 proximate to a bottom side 122 of each of the plurality of beds allowing each bed to move in a first direction $D_1$ and a second direction $D_2$. A support element 140 is positioned underneath each bed such that a movable element is between a bed and a support element. Because each of the plurality of beds are positioned on top of a support element, the system 100 may comprise a plurality of support elements. In one embodiment, the support element comprises an elongated table with has on it the moveable element with allows the bed to move horizontally. Tracks, rails and other elements for restricting the movement of the beds in more than first direction and second direction may be used and are within the spirit and scope of the present invention.

An opening 135 is proximate to the perimeter of each of the plurality of beds. The opening is proximate to a corner of each of the plurality of beds. The first direction and the second direction are opposite to each other such that the beds only translate along one axis of a plane parallel to the ground. In other words, the beds are configured to move horizontally above the ground in the first direction that opposes the direction. The system further includes a u-shaped spacer 500, wherein the u-shaped spacer comprises a first leg 505, a second leg 510, and a cross-member 515 attaching the first leg to the second leg. The first leg is removably received by the opening 135 of a first bed of the plurality of beds, and the second leg of the u-shaped spacer is removably received by the opening of a second bed of the plurality of beds that is adjacent to the first bed. The legs of the u-shaped spacer are configured to be securely inserted into the opening of a bed but can also be removed from the openings. A securing element 145 is in attachment with the support element and configured to inhibit the bed from moving in the first direction. A plurality of securing elements may be in attachment with the each of the plurality of beds and the plurality of support elements. The securing element may be a hook, cord, rope, fastener, plate, lock, etc., that functions to prevent the beds from moving horizontally.

The system also includes a sensor 185, processor, and display. The sensor is configured to monitor a position of at least one of the beds and the u-shaped spacer. The processor is configured for receiving a first signal or data from the sensor, determining whether each bed of the plurality of beds is in a first configuration, and sending a second signal or data to a display comprising bed configuration data. In the first configuration, the u-shaped element connects the first bed to the second bed, and, in the second configuration, the u-shaped element does not connect the first bed with the second bed. The display is configured to output a graphical representation of the position each of the plurality of beds.

The plurality of beds 105 may be comprised of material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™. However, other materials may be used that are within the spirit and scope of the present invention. The beds may be formed from a single piece or from several individual pieces joined or coupled together. The components of the beds may be manufactured from a variety of different processes including an extrusion process, a mold, welding, shearing, punching welding, folding etc. However, other types of processes may also be used and are within the spirit and scope of the present invention. In the present embodiment, the plurality of beds may be as long as 8 to 54 feet. However, other dimensions may be used and are within the spirit and scope of the present invention.

The movable element 120 may be comprised of material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™. However, other materials may be used that are within the spirit and scope of the present invention. The movable element may be formed from a single piece or from several individual pieces joined or coupled together. The components of the movable may be manufactured from a variety of different processes including an extrusion process, a mold, welding, shearing, punching welding, folding etc. However, other types of processes may also be used and are within the spirit and scope of the present invention. In the present embodiment, the movable element is a plurality of rolling bars below the bed that allow the bed to translate positions on the support element. In other embodiments, the movable element may be wheels in attachment with the bottom of the bed.

The u-shaped spacer 500 may be comprised of material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™. However, other materials may be used that are within the spirit and scope of the present invention. The u-shaped spacer may be formed from a single piece or from several individual pieces joined or coupled together. The components of the u-shaped spacer may be manufactured from a variety of different processes including an extrusion process, a mold, welding, shearing, punching welding, folding etc. However, other types of processes may also be used and are within the spirit and scope of the present invention.

The support element 140 may be comprised of material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™. However, other materials may be used that are within the spirit and scope of the present invention. The support element may be formed from a single piece or from several individual pieces joined or coupled together. The components of the support element may be manufactured from a variety of different processes including an extrusion process, a mold, welding, shearing, punching welding, folding etc. However, other types of processes may also be used and are within the spirit and scope of the present invention. In the present embodiment, the support element is a table that reinforces the movable element and the bed.

Figure 3:
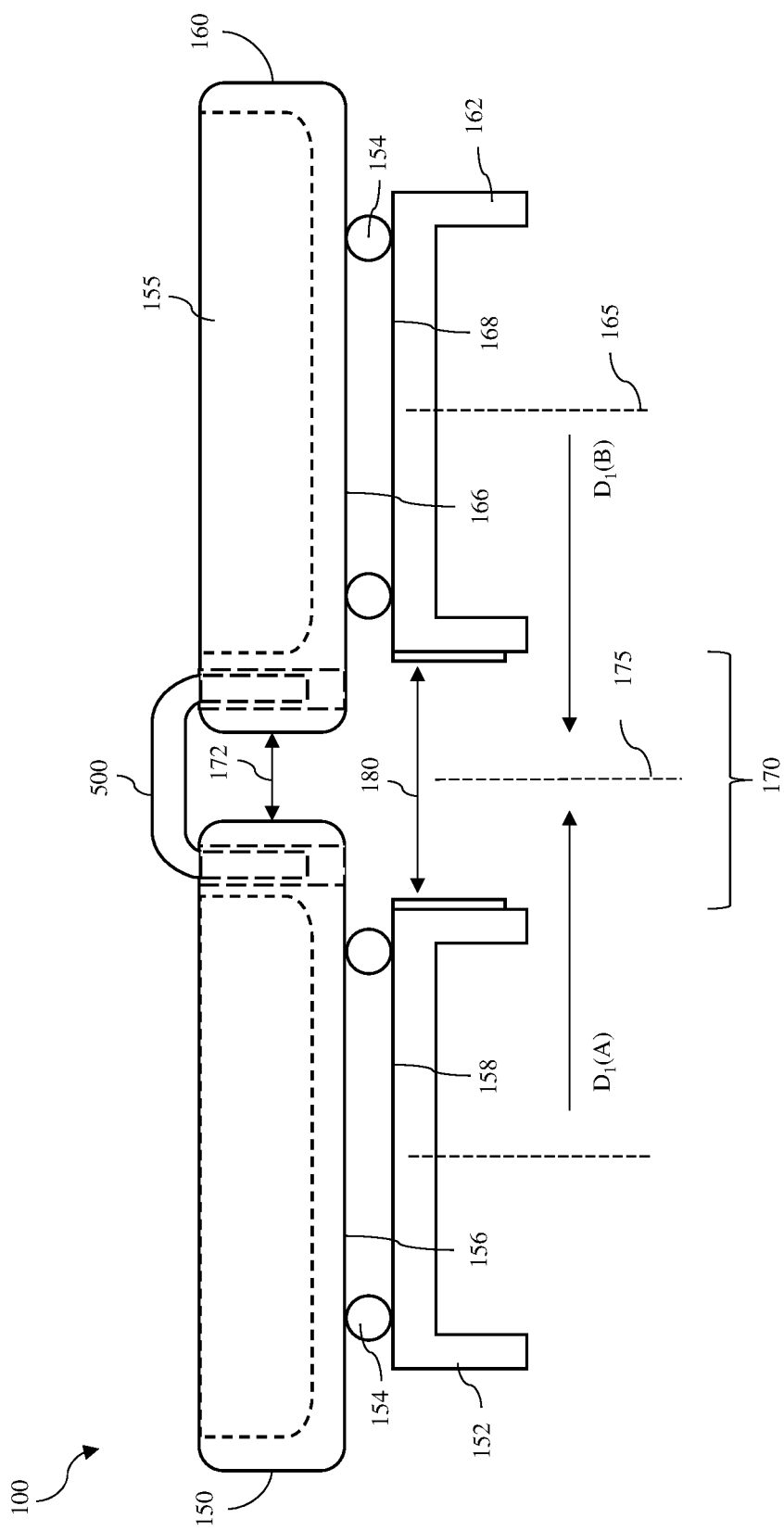
FIG. 3 is a side view of the system for improving the consistent spacing and moving of plant growing areas, according to an example embodiment.
Figure 4:
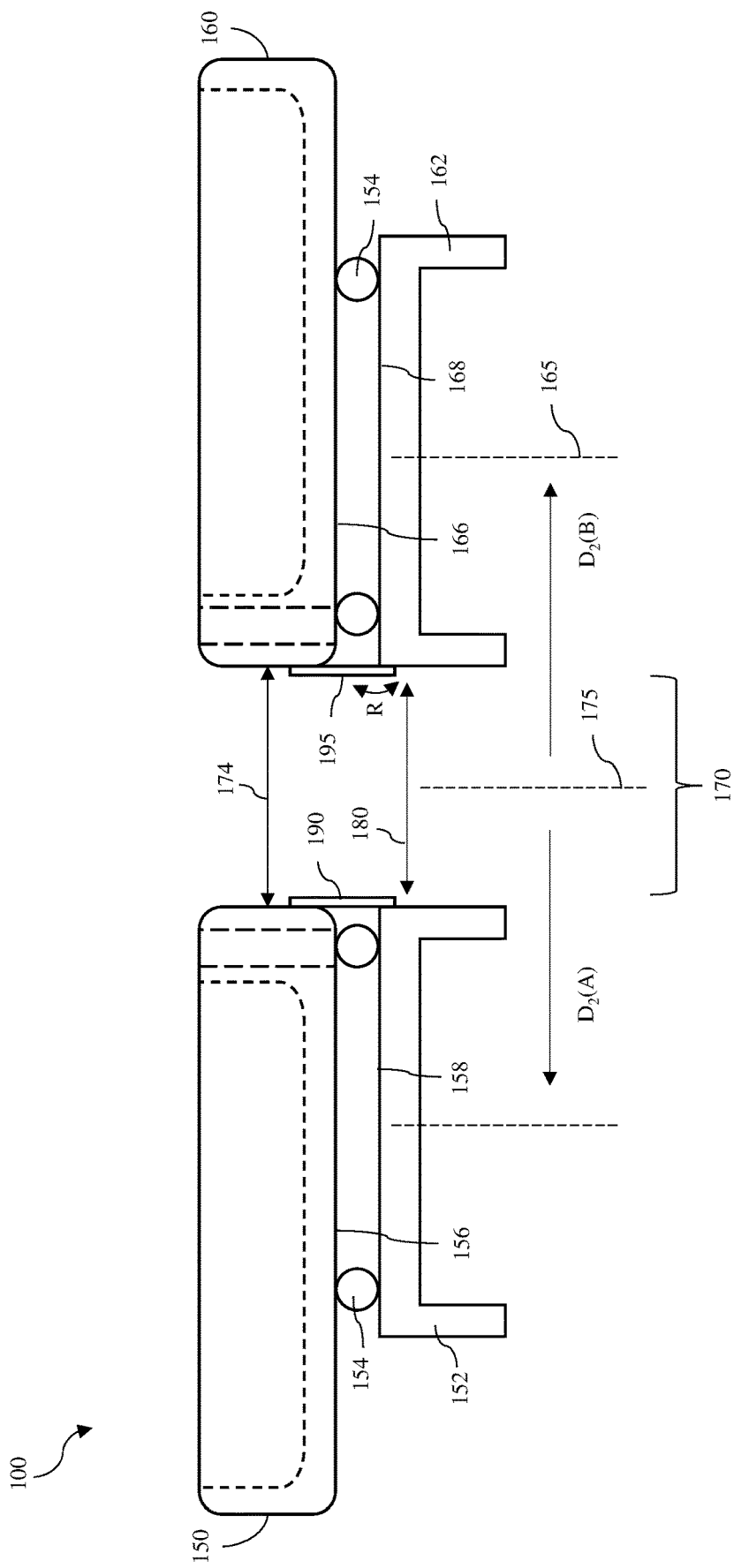
FIG. 4 is a side view of the system for improving the consistent spacing and moving of plant growing areas, according to an example embodiment.

The securing element 145 may be comprised of material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™. However, other materials may be used that are within the spirit and scope of the present invention. The securing element may be formed from a single piece or from several individual pieces joined or coupled together. The components of the securing element may be manufactured from a variety of different processes including an extrusion process, a mold, welding, shearing, punching welding, folding etc. However, other types of processes may also be used and are within the spirit and scope of the present invention. In the present embodiment, the securing element may be proximate to the opening of the bed and in attachment with the edge of the support element that faces an adjacent support element. The securing element may be a hook, a clasp, or an elongated element like a square plate. However, other types of support elements may be used and are within the spirit and scope of the present invention. For example, as shown in FIG. 4, the securing element may be a plate (190, 195) that is attached to a portion of the support element that is configured to rotate between locked configuration (as shown in FIG. 4) and a un-locked configuration (as shown in FIG. 3). The securing element may be hingedly attached etc. to the support element such that the securing element is able to pivot between the locked and un-locked configuration (in the direction of double arrowed line R). It is also understood that a securing element may also be included on the opposite side of the bed so that the bed does not move in the opposite direction as well.

Referring now to FIG. 3 and FIG. 4, side views of the system 100 having a first bed 150, second bed 160, and u-shaped spacer 500 are shown, according to an example embodiment. The first bed is disposed adjacent to the second bed, wherein each of the first bed and the second bed comprises a receiving area 110 for receiving plants and a perimeter 115. The receiving area further comprises a recess 155 disposed inside the perimeter configured to carry the plants. The recess is a wide vacant space that has a smaller area than the bed and may concave edges. The recess may be surrounded by a lip that prevents plants from falling off the top surface of the bed when moving between the first configuration and second configuration. An opening 135 is proximate to the perimeter of each of the first bed and the second bed, respectively. The opening is positioned near a corner of each of the first bed and second bed. The present invention also includes a u-shaped spacer 500 comprising a first leg 505, a second leg 510, and a cross-member 515 attaching the first leg to the second leg. The first leg is removably received by the opening of the first bed 150, and the second leg is removably received by the opening of the second bed 160. The first bed may be connected to the second bed by the u-shaped spacer. The u-shaped spacers provide a consistent spacing between each of the beds to maximize the amount of beds within the area 116.

A first support element 152 is disposed adjacent to a second support element 162, wherein each support element comprises a support element midline 165. In one embodiment, the support element may be a table having a horizontal section and vertical support elements. While only two vertical support elements are shown, it is understood that there may be multiple vertical support members. The support element midline represents a vertical line that spans through the middle of the support element. The first support element is below the first bed while the second support element is below the second bed. As mentioned before the support elements may be a table having a horizontal support member supported by at least one vertically arranged support member. A first moveable element 154 is proximate to a first bed bottom side 156 and a first support element top surface 158 such that the first movable element is positioned in between the first bed bottom side and the first support element top surface to allow the bed to move across the first support element. As shown more than one first movable element may be used and it is understood that in other embodiments additional moveable elements may be used and are within the spirit and scope of the present invention. In other words, the moveable elements allow the beds to move horizontally relative to the support elements. A second moveable element 164 is proximate to a second bed bottom side 166 and a second support element top surface 168 such that the second movable element is positioned in between the second bed bottom side and the second support element top surface to allow the bed to move across the second support element. As shown more than one second movable element may be used and it is understood that in other embodiments additional moveable elements may be used and are within the spirit and scope of the present invention. In other words, the moveable elements allow the beds to move horizontally relative to the support elements. Each of the first moveable element and the second moveable element are configured to move at least one of the first bed and second bed in a first direction $D_1$ and second direction $D_2$.

The system also includes an aisle 170 comprising an aisle midline 175, wherein the aisle is defined by a space between the first support element and second support element that allows passage between each bed. The aisle defines an aisle dimension 180 such that a person is able to walk through. The aisle midline represents a vertical line that perpendicularly intersects the midpoint of the aisle dimension. The first direction is towards a midline of an aisle, and the second direction is towards a midline of the support element. When moving the first direction, the first bed moves in direction $D_1(A)$, and the second bed moves in direction $D_1(B)$. When moving in the second direction, the first bed moves in direction $D_2(A)$, and the second bed moves in direction $D_2(B)$. A first securing element 190 in attachment with the first support element configured to inhibit the first bed from moving in the first direction into the aisle. A second securing element 195 in attachment with the second support element configured to inhibit the second bed from moving in the first direction into the aisle. A securing element 145 is in attachment with each of the first support element and the second support element. Each securing element is configured to inhibit the bed from moving in the first direction into the aisle.

In the first configuration, the u-shaped spacer is received in the opening 135 of the first bed 150 and the second bed 160, and the first bed is a first distance 172 from the second bed. The cross-member 515 of the u-shaped spacer comprises a cross-member length 520 configured to separate the first bed and the second bed by the first distance, wherein the cross-member length is at least equal to half of a width of the aisle. In the second configuration, the u-shaped spacer is not received by least one of the opening of the first bed and the opening of the second bed, and the first bed is a second distance 174 away from the second bed. In other words, in the first configuration the u-shaped element is inserted in the opening such that adjacent beds are connected to each other by the u-shaped element and also are configured to translate with each other. The u-shaped element provides the appropriate spacing when all of the beds are connected with each other such that the maximum amount of beds are positioned within area 115.

Figure 5:
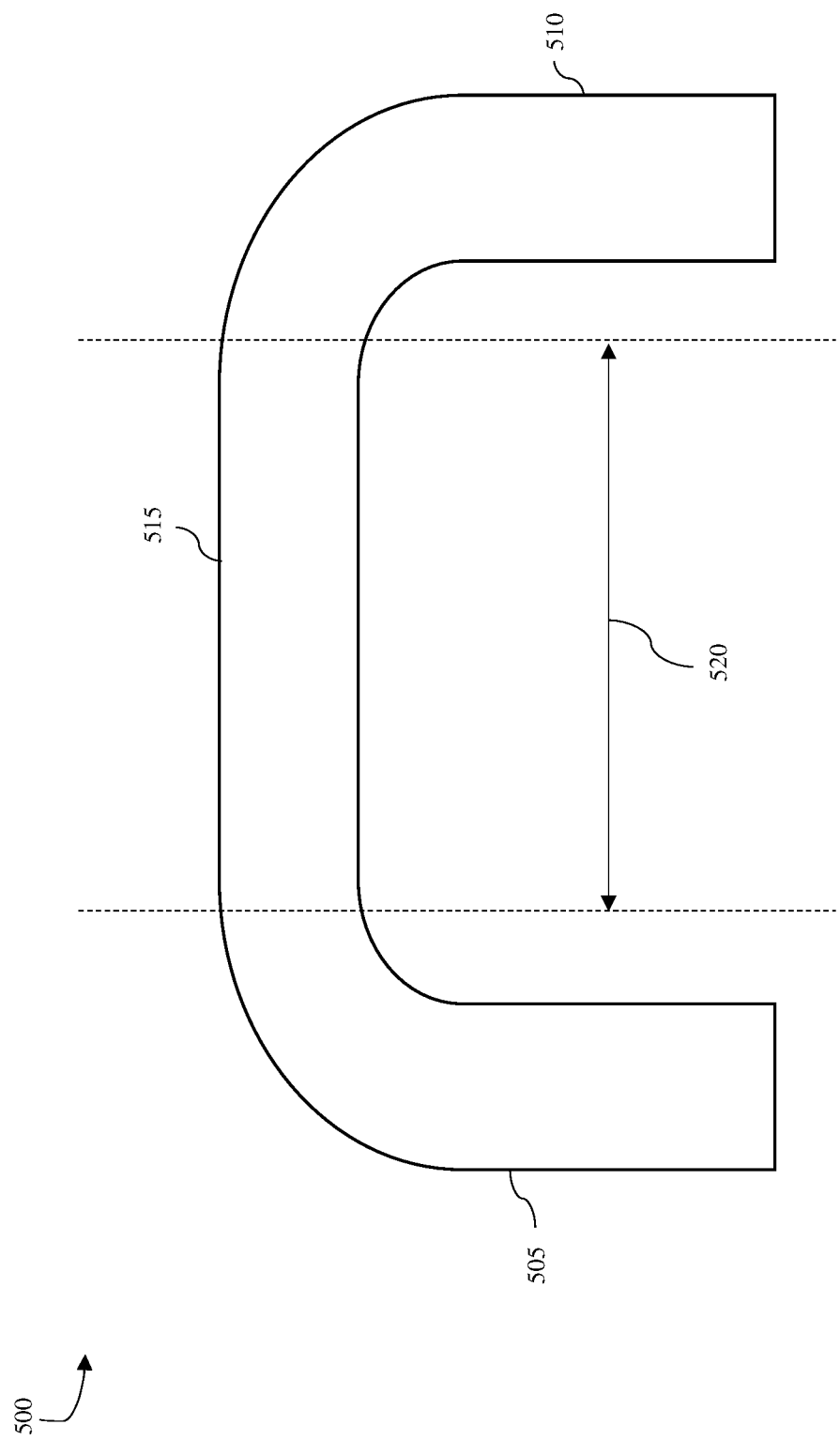
FIG. 5 is a front view of the u-shaped spacer, according to an example embodiment.

Referring now to FIG. 5, FIG. 5 illustrates a front view of the u-shaped spacer 500, according to an example embodiment. The u-shaped spacer comprises a first leg 505, a second leg 510, and a cross-member 515 attaching the first leg to the second leg. The first leg fits into an opening of a bed while the second leg fits into an opening of an adjacent bed. The cross-member of the u-shaped spacer comprises a cross-member length 520 configured to separate adjacent beds of the plurality of beds by a distance at least as great as half of a width of an aisle 170. The cross-member length may be as long as 5 to 8 inches. However, other lengths may be used and are within the spirit and scope of the present invention. The length is configured to efficiently space the beds apart such that the plants in the plurality of beds undergo a healthy growth cycle within the system.

Figure 6A:
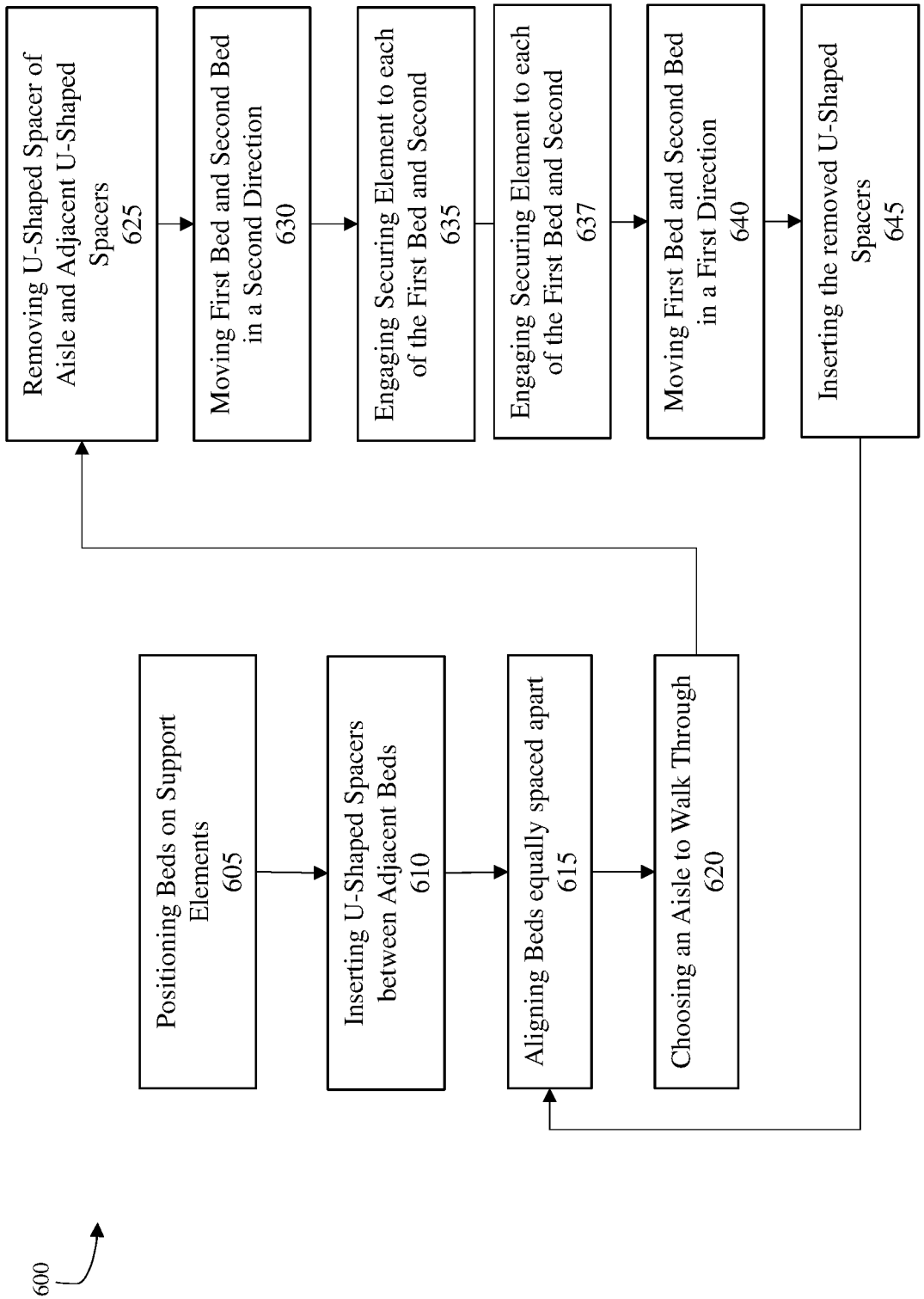
FIG. 6A is a block diagram illustrating a method of providing spacing and mobility of a plurality of beds to promote plant growth.
Figure 6B:
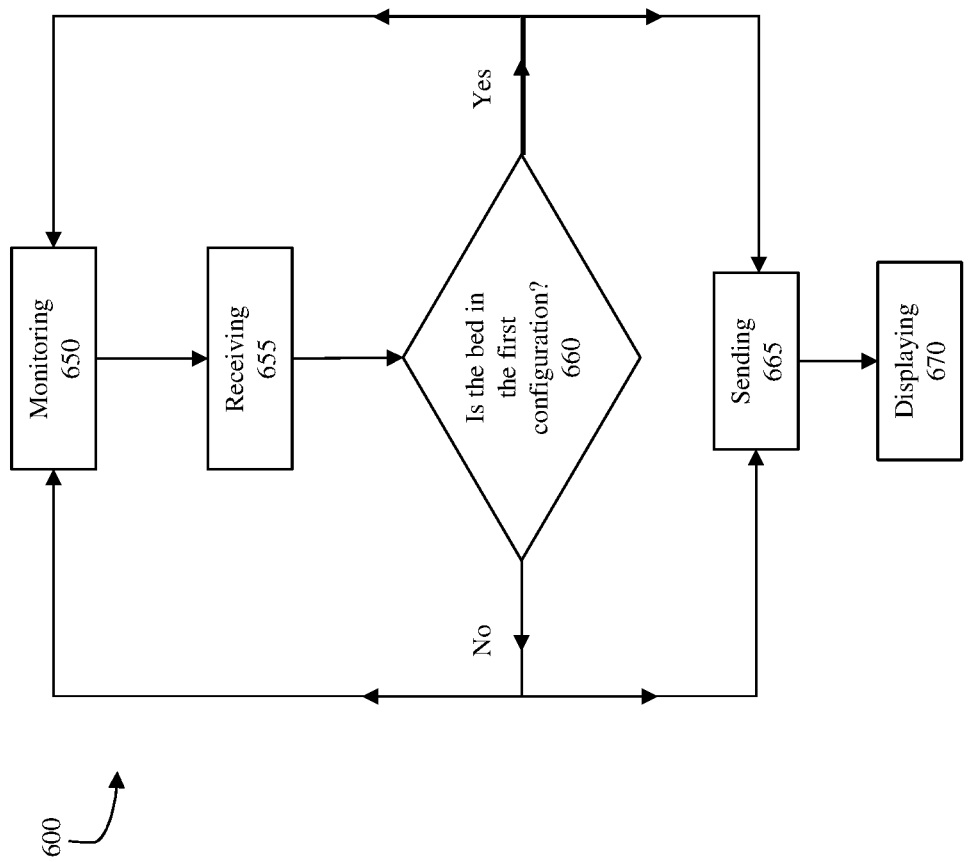
FIG. 6B is a block diagram illustrating a method of providing spacing and mobility of a plurality of beds to promote plant growth.

Referring now to FIGS. 6A and 6B, block diagrams illustrating a method 600 of providing spacing and mobility of a plurality of beds to promote plant growth is shown, according to an example embodiment. At step 605, the beds 105 are positioned on the support elements 140, which are already spaced apart within the system 100. At step 610, the u-shaped spacers are inserted into the openings of adjacent beds to create consistent spacing between beds. The u-shaped spacers align the beds equally spaced apart at step 615 as illustrated in FIG. 1. It is understood that in certain embodiments, the beds positioned at the ends may be fixed so that the ends beds cannot move outside area 115. Now that the beds are equally spaced, an operator of the grow room may need to access certain beds, also known as grow areas. Therefore, an aisle must be chosen to walk through at step 620. To access an aisle, three u-shaped spacers must be removed as illustrated in FIG. 2. At step 625, the u-shaped spacer of the chosen aisle and its adjacent u-shaped spacers are removed. This allows the two beds proximate to the chosen aisle to move in a second direction towards the midline of their respective support elements. In this embodiment, the two beds proximate to the chosen aisle are the first bed and second bed, which are moved in the second direction at step 630. At step 635, the securing elements 190, 195 are engaged or moved into their locked position (as illustrated in FIG. 4) for each of the first bed and second bed to keep the first bed and second bed from moving in the first direction. At this step, the aisle between the first bed and the second bed will now be accessible such that the health of the plants in each of the first bed and second bed may be examined during the growth stage. Once examination or work done along the first bed and second bed is completed, at step 637, the securing elements for each of the first bed and second bed disengaged or moved to their unlocked position (as illustrated in FIG. 3) so that the beds may be moved back into the first configurations and so that all of the beds may be spaced equally apart within area 115. In step 640, with the first bed and second beds are now allowed to move in the first direction towards the aisle midline. At step 645, the previously removed u-shaped spacer are inserted back into their previous positions before step 625 so that the beds are in the first configurations and so that all of the beds may be spaced equally apart within area 115.

FIGS. 6B-8 are figures that may be used the system may be used to produce a display that provides a graphical indicator or representation if the beds are in the first configuration or in the second configuration. As mentioned above, in the first configuration the u-shaped spacer is received in the opening of the first bed and the second bed and the first bed is a first distance 172 from the second bed. It is understood that the first distance is the dimension of space between the beds when a spacer connects the beds. The first distance is small so that the maximum amount of beds are positioned in 115 while provides enough of a distance such that the plants on the each of adjacent beds have sufficient room for optimal growth. For example, in FIG. 1, all the beds are in the first configuration. In the second configuration the u-shaped spacer is not received by least one of the opening of the first bed and the opening of the second bed, and the first bed is a second distance away from the second bed. In FIG. 2, only bed one is in the first configuration. The second distance 174 is a distance not equal to the first distance because the u-shaped spacers are not inserted into the adjacent beds.

At step 650, the sensor 185 of each bed or spacer monitors a position of the beds and u-shaped spacers. In other embodiments, the sensors are configured for monitoring configuration of all of the beds and all of the U-shaped spacers. The sensors will monitor the configurations based on the normal way that sensors monitor different things depending on the type of sensor that the sensor is. For example, the sensor may be disposed in each of the openings to detect if the u-shaped spacer is in each of the openings. In other embodiments, a sensor may be positioned on the spacer to detect if the spacer is within a certain distance from another sensor. However, other means or sensors of detecting if the u-shaped spacer is in the openings. Sensors may be used to monitor the position of each of the beds to determine if the bed is in correct configuration. For example, sensor(s) may be used to determine if a certain portion on a bed is positioned relative to a certain portion of the support element (or within a predetermined range or tolerance) so that sensors may detect if the bed is in a correct configuration.

While FIG. 1 only illustrates one sensor on each bed, it is understood that a plurality of sensors in different locations may be used in order to detect the configuration of the beds and U-shaped spacers. The sensor sends a first signal indicating the position of at least one of the beds and u-shaped spacers to the processor thereby allowing the processor to receive the first signal at step 655. The first signal may include data as to what configuration the bed is in, namely the first configuration and second configuration. The system may be also configured such that a signal from one of the sensors is configured for determining the configuration (either the first configuration or second configuration also known as inserted or not inserted) of each of U-shaped spacers is relative to the openings within each of the beds. The system may be configured that such that the sensors are wirelessly connected with the processor or processing unit; however, other embodiments the sensors may be hardwired to the sensor using conductors such that the processor sensors are in electrical communication with each other.

At step 660, the processor determines whether the bed and or spacer is in a first configuration. The processor or processing unit may be also configured for determining whether the bed or the u-shaped spacer is in the second configuration. The first configuration would indicate that the bed is in connection with at least one of two adjacent beds while the second configuration would indicate that the bed is not in connection with both adjacent beds. The processor then sends a second signal comprising bed configuration data to the display at step 665. The display may be on a computing device 720 that is remote from the room or space in which the beds are located so that a user may remotely monitor that the beds are positioned correctly. The bed configuration data comprises information for displaying at least one of a first graphical indicator 672 and a second graphical indicator 673 on a graphical user interface or display of computing 720. If the bed is in the first configuration, then the bed configuration data comprises information for displaying the first graphical indicator. The first graphical indicator is a graphical representation that the first bed is in the first configuration. If the bed is not in the first configuration, then the bed configuration data comprises information for displaying the second graphical indicator. The first graphical indicator would indicate that a bed is in attachment via u-shaped spacer to at least one adjacent bed. The second graphical indicator is a second graphical representation that the first bed is in the second configuration. The bed configuration data further comprises the information for displaying a u-shaped spacer status for the u-shaped spacer. At step 670, the display interface 671 shows the confirmations of the of beds and the u-shaped spacers.

Figure 7A:
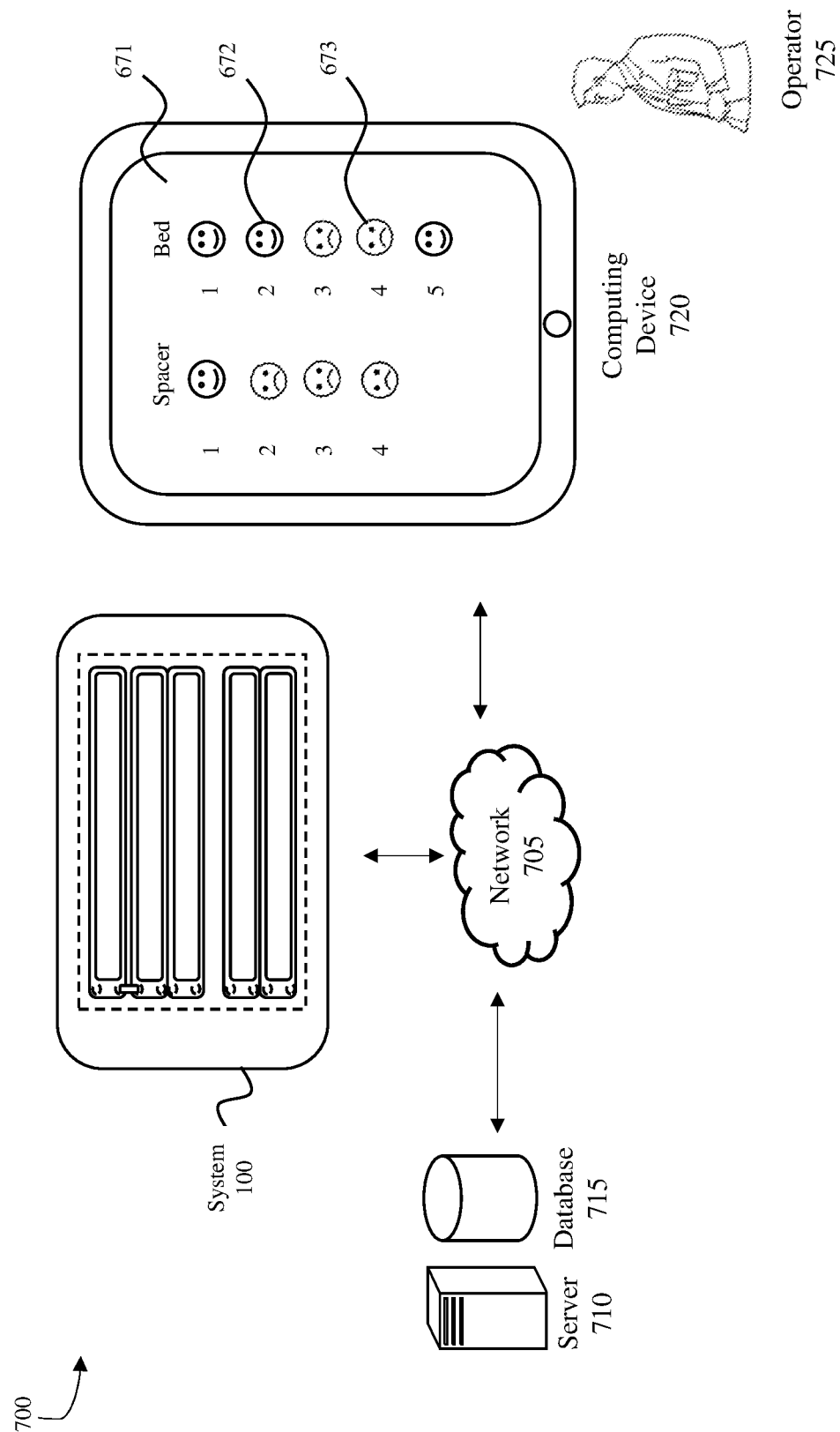
FIG. 7A is a diagram of the operational environment to support the spacing system to promote plant growth, according to an example embodiment.

As shown in FIG. 7A-7C, the configurations of the beds and spacers are illustrated on displays of a remote computing device 720. The display for FIGS. 7A-7C correspond to how the beds are positioned in the grow room in FIG. 2. The first configuration may be illustrated by an icon with a positive connotation such as smiley face. The first graphical indicator having a positive connotation allows the operator to know that a bed is in the first configuration. The second configuration may be represented by a second graphical indicator, which may depict an icon with a negative connotation such as frown face. The second graphical indicator having a negative connotation allows the operator to know that a bed of is in the second configuration. In certain embodiments, as illustrated in FIG. 7A, the position of each of the u-shaped spacers and beds may be separated out so that the user may determine which bed is out of position or which spacer is out of position. In other embodiments, as illustrated in 7B, the display may use a single graphical indicator to illustrate first configuration and second configuration of the combination of the beds and spacers.

The status of each u-shaped spacers may comprise the u-shaped spacer status indicating whether a u-shaped spacer is inserted or removed into the openings. The status of an inserted u-shaped spacer may be represented by an icon with a positive connotation such as a smiley face. The status of a removed u-shaped spacer may be represented by an icon with a negative connotation such as a frown face. However, it is understood that other graphical indicators may be used and are within the spirit and scope of the present invention. The statuses of the beds and u-shaped spacers allow the operator to know whether an aisle is open or closed within the system 100.

In the present embodiment, the display interface 671 illustrated in FIG. 7A may display graphical representations of configurations for each of four u-shaped spacers and five beds, which correspond to the embodiment shown in FIG. 2. It is understood that if more or less beds are used the system will be configured to display graphical indicators or representations corresponding to each bed and u-shaped spacer. The u-shapers and beds are labeled in ascending order, in which u-shaped spacer 1 is the topmost u-shaped spacer, and bed 1 is the topmost bed. Referring back to FIG. 2, because bed 1 680, bed 2 681, and 5 684 are in the correct position, the first graphical indicator 672 is depicted immediately to the right of bed 1, 2, and 5's labels. This allows the user to know based on viewing the information on the display interface 671 that these beds are in correct position. Because bed 3 682 and 4 683 are not in the correct position, the second graphical indicator 673, denoting that the those beds are out of position, is depicted immediately to the right of bed 3 and 4's labels. This allows the user to know based on viewing the information on the display interface 671 that these beds are out of position. The statuses or positions of the u-shaped spacers are also depicted to the right of the corresponding u-shaped spacer. However, it is understood that the location of the statuses or the graphical indicators used may be in different locations on the display. As illustrated in FIG. 7A, only spacer 1 is positioned in both of the openings, which corresponds to FIG. 2.

It is also understood that other types of graphical indicators may be used and are within the spirit and scope of the present invention. For example, in FIG. 7B, only one graphical indicator is used to denote that if the beds and spacers are in the first or second configuration. As mentioned, above in one embodiment, in the first configuration the u-shaped spacer is received in the opening of the first bed and the second bed and the first bed is a first distance from the second bed in the second configuration the u-shaped spacer is not received by least one of the opening of the first bed and the opening of the second bed, and the first bed is a second distance away from the second bed. Since u-shaped spacer 1 685 is inserted into the openings of bed 1 and 2, a single graphical representation or icon 691 is depicted. This allows the user to know based on viewing the information on the display interface 671 in FIG. 7B that the spacers are in inserted into the opening on the bed and the if the bed is in its correct position.

In one embodiment, the u-shaped spacer 2 686, u-shaped spacer 3 687, and u-shaped spacer 4 688 are removed, which causes the system to display on computing device a graphical representation of graphical indicators or icons with a negative connotation or a certain graphic embodiment is depicted on display 671 (as shown on FIG. 7A). The operator may know that an aisle should be open only between beds 3 and 4 because beds 3 and 4 are the only adjacent beds that not in position. Another way for the operator to know which aisles are open or closed is statuses of the u-shaped spacers. Still referring to FIG. 7A, because the status of three adjacent u-shaped spacers are depicted by a frown face, which has a negative connotation, the operator may know that an aisle is open where the middle u-shaped spacer of the three u-shaped spacers is removed. In this embodiment, the operator may know that the aisle in which u-shaped spacer 3 is removed should be open. In another embodiment, the display interface may portray the statuses of aisles such that the operator can virtually see which aisles are passable. The statuses of the aisles may be computed by the processor or processing unit depending on the statuses of the beds and u-shaped spacer. After a user finishes working in the area, the user may view the display 671 to determine if all the beds are in the correct configuration and all the U-shaped spacers are inserted into the spacers to appropriately space the beds. If the user notices on the display that, based on graphical indicators depicting the beds, that the beds are in an incorrect place or the u-shaped spacers are not as inserted into holes of adjacent beds, the user may properly align the beds and spacers so that the sensors that are used to identify if these spacers and beds are either in the first or second configurations can read that the beds and u-shaped elements are in the correct configuration.

In other embodiments, only a single graphical representation is used for each bed and spacer combination. For example, as shown in FIG. 7B, in one embodiment, a certain graphical representation will be displayed on the display interface 671 indicating that the bed and its associated spacer are in the first configuration. If either the bed or the spacer is not in the first configuration, then the system will be configured to display a second certain graphical representation associated with the bed as shown in FIG. 7B. Because only the first bed and first spacer are both in the first configuration (as illustrated in FIG. 2), only icon 691 illustrates a positive connation or certain graphical representation while icons 692-695 illustrates a negative connation or second certain graphical representation because either the bed or the spacer (in FIG. 2) is not in the first configuration. However, in other embodiments, different graphical representations may be used and within the spirit and scope of the present invention.

In other embodiments, as shown in FIG. 7C, a list of aisles and a graphical representation for each aisle may be used. If an aisle is open, a certain graphical representation will be displayed indicating that the aisle is open for passage. If an aisle is closed, a second certain graphical representation will be displayed indicating that the aisle is unpassable. Because only aisle 3 698 is open, an icon is displayed illustrating a positive connotation or certain graphical representation. Because aisles 1 696, 2 697, and 4 699 are close, an icon is displayed illustrating a negative connotation or a second certain graphical representation. However, in other embodiments, different graphical representations may be used and within the spirit and scope of the present invention.

It is understood that this method is a continuous cycle and that each step of method 600 may operate concurrently with another step of method 600 to provide consistent spacing and moving of grow areas for aisle accessibility within the system. In other embodiments, the method may further include additional steps to promote plant drying or moisture removal consistent with the systems disclosed herein.

Referring now to FIG. 7, a diagram of the operational environment 700 to support the spacing system to promote plant growth is shown, according to an example embodiment. The operational environment includes a network 705 in communication with the system 100, having the grow room and the grow area, a server 710, a database 715, and a computing device 720 controlled by operator 725. The server and database may include at least one processor or processing unit configured to control the components of the system including, but not limited to, at least one of the beds, u-shaped spacers, and securing elements. The processor may control other components and systems necessary to maintain positive static pressure within the grow room and optimize plant yield. The sensors 185 may monitor the system 100 and the beds 105 such that the beds, u-shaped spacers, and securing elements are in certain configuration, such as the first or second configurations. The sensors may be in electrical communication to the processor or processing unit of the system or may be connected over a communications network 705 and the server 710 may act as the processing unit. These sensors 185 may be an optical sensor, ultrasonic sensor, laser senor, pressure sensor, electrical sensor, global positioning system sensor, and wherein each sensor may be one integrated unit or may comprise a plurality of sensors distributed throughout the bed. The sensors may be positioned on, near, next to, within the bed, the openings on the bed, the U-shaped spacers, or in the room to identify which configuration the bed is located and which configuration (inserted into both openings, or a single opening, or not inserted) the spacers are located. However, it is understood that other embodiments, may be used to identify the configuration of the beds or u-shaped spacers.

The system monitors these configurations to maintain correct spacing of beds. In certain embodiments, the status of the beds, u-shaped spacers, and securing elements are displayed on a computing device 720 such as a computer or display monitor in communication with the at least one processor or processing unit. The computing device may be controlled by the operator 725. In certain embodiments, the computing device may be configured to receive an input from the operator and send a signal to the at least one processor comprising information to engage at least one of the u-shaped spacers and securing elements within the system. The operator can control the grow room in the operation configuration to ensure that the environmental parameters remain within the predetermined environmental parameter thresholds. Additionally, the computing device may include a display such that the parameters of the grow room, as recorded by the sensors, are graphically displayed to the operator. For example, the computing device has a display illustrating the status, either connected or disconnected, of each u-shaped spacer and bed. In other embodiments, operational status of the components of the room, such as the securing elements, may be displayed on the computing device. Other embodiments displaying information about the components of the grow room as disclosed herein are within the spirit and scope of the disclosure.

Figure 8:
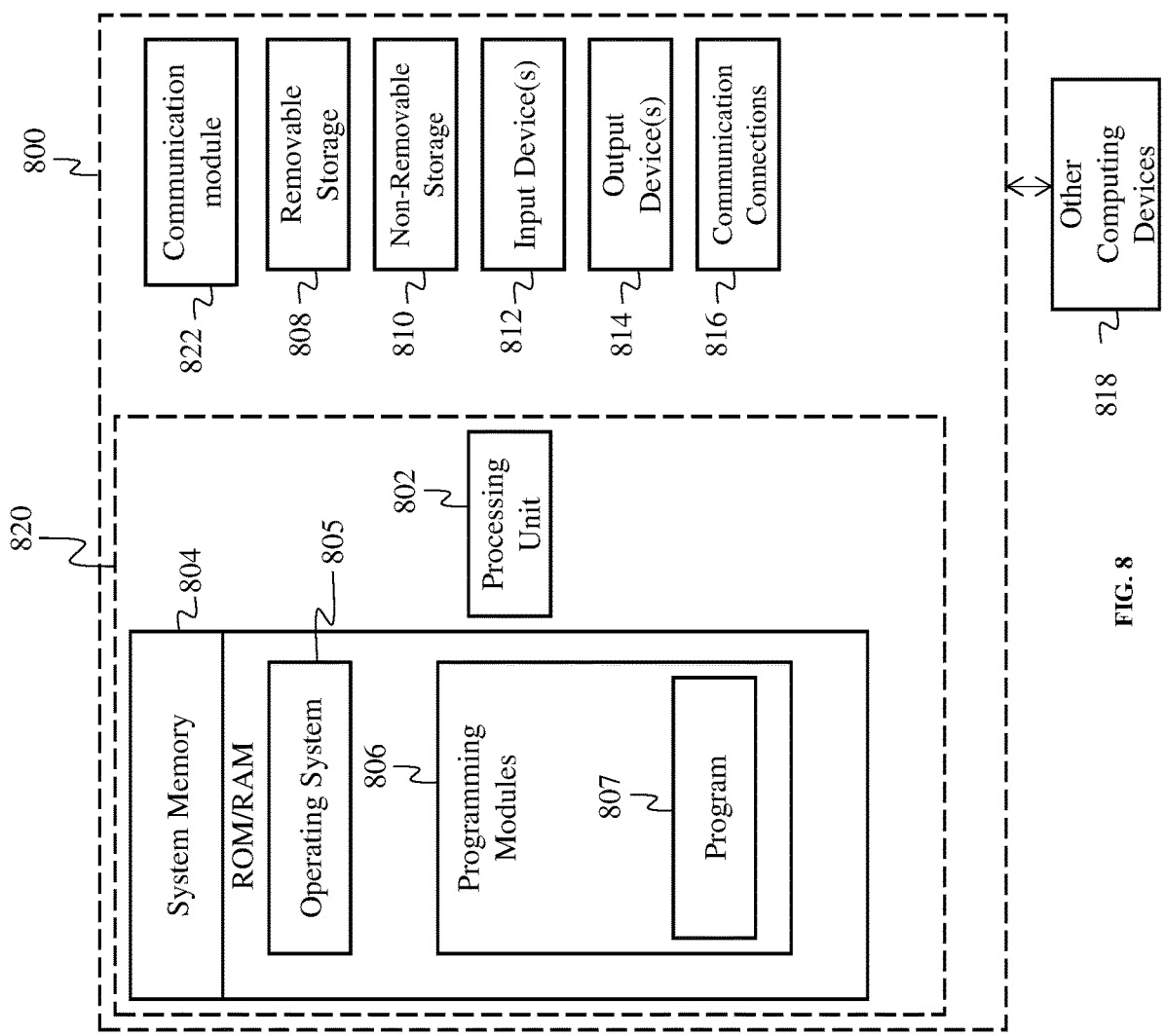
FIG. 8 illustrates a block diagram of a computer system according to exemplary embodiments of the present technology, according to an example embodiment.

Referring now to FIG. 8, a block diagram 800 illustrating a processor that may be configured be for performing the functions of the processor or processing unit of the system, according to exemplary embodiments of the present technology is shown. For example, the processor may be configured for receiving signals having data from the sensors, sending a signal to the computing device 720 to display graphical representations of the first configuration and second configuration of each of the beds of the system, for determining the status or configuration of reach of the beds or U-shaped spacers, and for sending signals to they system to perform certain functions. Consistent with the embodiments described herein, the aforementioned actions performed by system 100 may be implemented in a computing device or processor, such as the computing device 800 of FIG. 8. Any suitable combination of hardware, software, or firmware may be used to implement the computing device. The aforementioned system, device, and processors are examples and other systems, devices, and processors may comprise the aforementioned computing device. Furthermore, the computing device may comprise an operating environment 700 for system 100. Processes, data related to system 100 may operate in other environments and are not limited to the computing device.

A system consistent with an embodiment of the disclosure may include a plurality of computing devices, such as the computing device 800. In a basic configuration, the computing device may include at least one processing unit 802 and a system memory 804. Depending on the configuration and type of computing device, system memory 804 may comprise, but is not limited to, volatile (e.g., random access memory (RAM)), non-volatile (e.g., read-only memory (ROM)), flash memory, or any combination or memory. System memory 804 may include operating system 805, and one or more programming modules 806. Operating system 805, for example, may be suitable for controlling the computing device's operation. Furthermore, embodiments of the disclosure may be practiced in conjunction with a graphics library, other operating systems, or any other application program and is not limited to any particular application or system. This basic configuration is illustrated in FIG. 8 by those components within a dashed line 820.

The computing device 800 may have additional features or functionality. For example, the computing device may also include additional data storage devices (removable and/or non-removable) such as, for example, magnetic disks, optical disks, or tape. Such additional storage is illustrated in FIG. 8 by a removable storage 808 and a non-removable storage 810. Computer storage media may include volatile and nonvolatile, removable, and non-removable media implemented in any method or technology for storage of information, such as computer readable instructions, data structures, program modules, or other data. System memory 804, removable storage 808, and non-removable storage 810 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information, and which can be accessed by the computing device 800. Any such computer storage media may be part of the computer device. The computing device may also have input device(s) 812 such as a keyboard, a mouse, a pen, a sound input device, a camera, a touch input device, etc. Output device(s) 814 such as a display, speakers, a printer, etc. may also be included. The aforementioned devices are only examples, and other devices may be added or substituted.

The computing device 800 may also contain a communication connection 816 and communication module 822 that may allow system 100 to communicate with other computing devices 818, such as over a network in a distributed computing environment, for example, an intranet or the Internet. Communication connection 816 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media. While executing on the computing device, communication module may perform processes including, for example, one or more of the steps or stages of the method 600 which may include communicating with the elements of system 100.

As stated above, a number of program modules and data files may be stored in system memory 804, including operating system 805. While executing on processing unit 802, programming modules 806 (e.g., program module 807) may perform processes including, for example, one or more of the stages of a processes illustrated in FIGS. 6A and 6B. The aforementioned processes are examples, and processing unit 802 may perform other processes. The aforementioned processes are examples, and processing unit 802 may perform other processes and may also be configured to provide a user interface displayed associated with devices explained above. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit including discrete electronic elements, packaged or integrated electronic chips containing logic gates, a circuit utilizing a microprocessor, or on a single chip (such as a System on Chip) containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages, and/or inserting or deleting stages, without departing from the disclosure.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A system for improving consistent spacing between a plurality of plant growing areas and for moving at least one of the plant growing areas, wherein the system comprises:
   a spacer comprising a first leg and a second leg;
   a plurality of beds arranged next to each other on a plurality of supports, wherein each support is separated by an aisle, wherein each bed of the plurality of beds comprises:
      an opening proximate to a perimeter of each bed of the plurality of beds for removably receiving one of the first leg and the second leg of the spacer; and
   at least one movable element proximate to a bottom side of each of the plurality of beds allowing each bed to move in a first direction and a second direction;
   a movable securing element attached to at least one of (i) the bed and (ii) a support element, having a locked configuration and an unlocked configuration,
      wherein, in the locked configuration, the movable securing element prevents a first bed of the plurality of beds from moving the first direction when the spacer is removed from the opening of at least one of the first bed; and
      wherein, in the unlocked position, the moveable securing element allows the first bed to move in the first and second direction.

2. The system of claim 1, wherein the opening is proximate to a corner of each of the plurality of beds.

3. The system of claim 2, wherein the receiving area further comprises a recess disposed inside the perimeter.

4. The system of claim 3, wherein the first direction is towards a midline of the aisle and the second direction is towards a midline of the support element.

5. The system of claim 1, wherein the spacer is a u-shaped spacer further comprising a cross-member attaching the first leg to the second leg.

6. A system for improving consistent spacing between a plurality of plant growing areas and for moving at least one of the plant growing areas, wherein the system comprises:
   a. a first bed disposed adjacent to a second bed, wherein each of the first bed and the second bed comprises:
      (i) a receiving area for receiving plants;
      (ii) a perimeter;
      (iii) an opening proximate to the perimeter of each of the first bed and the second bed, respectively;
   b. a u-shaped spacer, wherein the u-shaped spacer comprises a first leg, a second leg, and a cross-member attaching the first leg to the second leg;
   c. a first support element disposed adjacent to a second support element, wherein each support element comprises a support element midline;
   d. a first moveable element proximate to a first bed bottom side and a second moveable element proximate to a second bed bottom side wherein each of the first moveable element and the second moveable element are configured to move at least one of the first bed and the second bed in a first direction and second direction;
e. an aisle comprising an aisle midline, wherein the aisle is defined by a space between the first support element and the second support element;
f. wherein the first direction is towards a midline of the aisle and the second direction is towards a midline of the support element;
g. a first securing element in attachment with the first support element configured to inhibit the first bed from moving in the first direction into the aisle;
h. a second securing element in attachment with the second support element configured to inhibit the second bed from moving in the first direction into the aisle;
i. wherein the first leg is removably received by the opening of the first bed, and the second leg removably received by the opening of the second bed.

7. The system of claim 6, wherein the system further comprises a first configuration and a second configuration;
wherein in the first configuration the u-shaped spacer is received in the opening of the first bed and the second bed and the first bed is a first distance from the second bed; and
wherein in the second configuration the u-shaped spacer is removed from the opening of at least one of the first bed and the second bed, and the first bed is a second distance away from the second bed.

8. The system of claim 7, wherein the cross-member of the u-shaped spacer comprises a cross-member length configured to separate the first bed and the second bed by the first distance, wherein the cross-member length is at least equal to half of a width of the aisle.

9. The system of claim 8, wherein the opening of each of the first bed and the second bed is proximate to a corner of each of the first bed and the second bed.

10. The system of claim 9, wherein the receiving area further comprises a recess disposed proximate to the perimeter.

11. The system of claim 10, wherein the first moveable element is proximate to a first support element top surface and the second moveable element is proximate to a second support element top surface.

12. The system of claim 11, wherein the aisle defines an aisle dimension such that a person is able to walk through.

13. The system of claim 12, wherein the first bed is connected to the second bed by the u-shaped spacer.

14. A system for improving consistent spacing between a plurality of plant growing areas and for moving at least one of the plant growing areas, wherein the system comprises:
a. a plurality of beds arranged next to each other, wherein each bed of the plurality of beds comprises:
(i) a receiving area for receiving plants;
(ii) a perimeter;
(iii) at least one movable element proximate to the bottom side of each of the plurality of beds allowing each bed to move in a first direction and a second direction;
(iv) an opening proximate to the perimeter of each of the plurality of beds;
b. a u-shaped spacer, wherein the u-shaped spacer comprises a first leg, a second leg, and a cross-member attaching the first leg to the second leg;
c. a plurality of securing elements each configured to be in attachment with at least one of the plurality of beds;
d. wherein each securing element of the plurality of securing element is configured to secure one of the plurality of beds when the bed is moved in the second direction;
e. wherein the first leg is removably received by the opening of a first bed of the plurality of beds, and the second leg of the u-shaped spacer is removably received by the opening of a second bed of the plurality of beds that is adjacent to the first bed;
f. a sensor configured to monitor a position of at least one of the plurality of beds and the u-shaped spacer;
g. a processor, wherein the processor is configured for:
(i) receiving a first signal from the sensor;
(ii) determining whether each bed of the plurality of beds is in a first configuration; and
(iii) sending a second signal to a display comprising bed configuration data.

15. The system of claim 14, wherein the system further comprises a second configuration;
wherein in the first configuration the u-shaped spacer is received in the opening of the first bed and the second bed and the first bed is a first distance from the second bed; and
wherein in the second configuration the u-shaped spacer is removed from the opening of at least one of the first bed and the second bed, and the first bed is a second distance away from the second bed.

16. The system of claim 15, wherein the bed configuration data comprises information for displaying at least one of a first graphical indicator and a second graphical indicator on a graphical user interface,
wherein the first graphical indicator is a graphical representation that the first bed is in the first configuration; and
wherein the second graphical indicator is a second graphical representation that the first bed is in the second configuration.

17. The system of claim 16, wherein the bed configuration data further comprises the information for displaying a u-shaped spacer status for the u-shaped spacer.

* * * * *